United States Patent
Bonaventura (10) Patent No.: US 7,664,169 B2
(45) Date of Patent: Feb. 16, 2010

(54) METHOD AND SYSTEM FOR IMPROVING MODEM PERFORMANCE, COMPUTER PROGRAM PRODUCT THEREFOR

(75) Inventor: Marco Bonaventura, Venice (IT)

(73) Assignee: STMicroelectronics S.r.l, Agrate Brianza (IT)

( * ) Notice: Subject to any disclaimer, the term of this patent is extended or adjusted under 35 U.S.C. 154(b) by 578 days.

(21) Appl. No.: 11/496,970

(22) Filed: Jul. 31, 2006

(65) Prior Publication Data

US 2007/0140325 A1     Jun. 21, 2007

Related U.S. Application Data

(63) Continuation of application No. 11/298,418, filed on Dec. 9, 2005, now abandoned.

(30) Foreign Application Priority Data

Dec. 10, 2004   (EP) .................................. 04029272

(51) Int. Cl.
*H04L 5/16* (2006.01)
*H04B 1/38* (2006.01)
(52) U.S. Cl. .................. 375/222; 375/219; 375/260; 375/285; 375/295
(58) Field of Classification Search ................ 375/222, 375/219, 260, 285, 295
See application file for complete search history.

(56) References Cited

U.S. PATENT DOCUMENTS 5,479,447 A * 12/1995 Chow et al. ................. 375/260

6,829,307 B1 * 12/2004 Hoo et al. ................... 375/260
2002/0163973 A1    11/2002 Tsai et al. ................... 375/260

FOREIGN PATENT DOCUMENTS

| EP | 0 918 422 A2 | 5/1999 |
| WO | WO 02/17584 A2 | 2/2002 |
| WO | WO 02/060145 A2 | 8/2002 |

OTHER PUBLICATIONS

Tsai, S-H., et al., "Combined BIT Swap and Power Gain Adaptation for Error Rate Equalization in DMT Systems," in *Proceedings of the IEEE Int'l. Conference on Acoustics, Speech, and Signal Processing*, Quebec, Canada, May 17-21, 2004, pp. 1065-1068.
Cioffi, John M., "Multi-channel Modulation," Data Transmission Theory course text for EE379A-B and EE479, in preparation, Oct. 27, 2002, 118 pages.

* cited by examiner

*Primary Examiner*—Ted M Wang
(74) *Attorney, Agent, or Firm*—Lisa K. Jorgenson; Thomas J. Satagaj; Seed IP Law Group PLLC (57) ABSTRACT

A method controls performance of modem arrangements wherein a plurality of tones having associated gains with a maximum reachable value are used for carrying respective bitstreams. The method includes at least one of selectively swapping bits between the tones in the plurality and selectively changing the tone gains to optimized an error parameter. The method also includes: determining the current values for the associated gain, determining the gain margins between the maximum reachable values and the current values, and performing, to optimize the error parameter as a function of the margins, at least one of: varying the number of bits allocated to the tones, and performing a transmitted power variation by varying the gains.

31 Claims, 4 Drawing Sheets

METHOD AND SYSTEM FOR IMPROVING MODEM PERFORMANCE, COMPUTER PROGRAM PRODUCT THEREFOR

CROSS-REFERENCE TO RELATED APPLICATION

This application is a continuation of U.S. patent application Ser. No. 11/298,418, filed Dec. 9, 2005, now abandoned, which application is incorporated herein by reference in its entirety.

BACKGROUND OF THE INVENTION

1. Field of the invention

The present invention relates to modem technology, for instance for VDSL (Very high bit-rate Digital Subscriber Line) applications.

2. Description of the Related Art

In modem operation, a so-called bit swap algorithm is generally used during ShowTime (i.e., session of data payload transmission) to improve the quality of modem performance.

A bit swap process is used in discrete multi-tone (DMT) or OFDM (orthogonal frequency division multiplexing) based modulations (including wireless solutions) with a feedback channel to maximize the QoS (quality of service) when other methods are failing. In wireline modem applications using bit swap processing is mandatory both in ADSL and VDSL solutions.

The Bit Swap algorithm operates at the receiver side since there it can monitor the SNR (signal-to-noise ratio) and has all the information needed to make a bit swap decision. The target of bit swap processing is to minimize the BER (bit error rate) (or, equivalently, to maximize the noise margin). This is done by moving bits between different tones or by changing tone gains. Usually, the number of operations (moving bits between different tones or change the tone gain) is very limited to reduce the overhead channel rate. The literature on bit swap processing is not particularly extensive.

Bit swap processing must comply with a list of constraints. These constraints are usually related to a power spectral density (PSD) mask or to aggregate total power figures. Specific constraints exist in some standard to mitigate cross talk to other modems or simply related to the bit swap protocol.

Providing a good bit swap algorithm involves solving several problems. Some of the most significant of those problems are highlighted below:

the bit swap algorithm should be efficient, since e.g., 2 k (two thousand) tones may need to be processed in VDSL. A higher speed of the algorithm means that more bit swap requests can be finalized in the same period of time (higher reaction speed);

the bit swap algorithm should give selective priority to different operations to be performed, because the most urgent operations should be performed first. The criteria for assigning priorities to operations are based on BER (or Noise Margin) considerations. This is because the multi-tone margin (usually defined to be equal to or close to the minimum of the tone noise margins) should be increased in the fastest way even if the temporary bit and gain distribution is not optimum and then caused to converge towards the optimum one with lower priority (this means higher priority to fast and "dirty" approach, lower priority to slow and "clean" approach);

the bit swap algorithm should be stable. If a noise level variation occurs, it should be able to optimize bit and gain per tone distribution and it should be able to converge towards a certain bit and gain distribution (this means that after a certain number of bit swap requests no other bit swap request should occur);

the bit swap algorithm should give optimal or quasi-optimal results in terms of final BER once the algorithm is converged to a stable solution (i.e., multi-tone margin);

the bit swap algorithm should not be subject to blocking: sometimes, due to power constrains (or PSD constraints), it is not possible to perform any operation even if a better solution exists. This condition should be avoided;

the Bit Swap algorithm should be compatible with bit swap protocol constraints like, for example, the limited number of operations or discrete steps in the variation of the current gain, indicated $g_i$. It also should be compatible with power constraints (if existing).

BRIEF SUMMARY OF THE PRESENT INVENTION

One embodiment of the invention improves modem performance, and in particular provides an efficient bit swap arrangement adapted to meet the various design objectives highlighted in the foregoing.

One embodiment of the present invention is directed to a method for controlling performance of a modem arrangement wherein a plurality of tones having associated gains with respective maximum reachable values are used for carrying respective bitstreams. The method includes at least one of selectively swapping bits between the tones in the plurality and selectively changing the tone gains to optimize an error parameter. The method further includes:

determining current values for the associated gains;

determining gain margins between the maximum reachable values and the current values; and performing, to optimize the error parameter as a function of the gain margins, at least one of:

varying a number of bits allocated to the tones, and performing a transmitted power variation by varying the gains.

Other embodiments of the invention also relate to a corresponding system as well as a computer program product loadable in at least one computer and including software code portions for performing the step of the method of the invention. As used herein, reference to such a computer program product is intended to be equivalent to reference to a computer-readable medium containing instructions for controlling a computer system to coordinate the performance of the invention. Reference to "at least one computer" is evidently intended to highlight the possibility for the present invention to be implemented in a distributed/modular fashion.

The claims are an integral part of the disclosure of the invention provided herein.

An interesting feature of the method described herein lies in that it can be used both in VDSL and ADSL modems. Generally speaking, it can be used in all DMT (Discrete Multi-Tone Technology) or OFDM (Orthogonal Frequency Division Multiplexing) based modulations (including wireless solutions) with a feedback channel (called Overhead channel in DSLs). The arrangement described herein is held to be particularly advantageous when applied to VDSL modems. VDSL (an acronym for Very High Speed Digital Subscriber Lines) is today a very promising modem technology able to support high data rates (up to 100 Mbps).

BRIEF DESCRIPTION OF THE DRAWINGS

The invention will now be described, by way of example only, by referring to the enclosed figures of drawings, wherein.

DETAILED DESCRIPTION OF THE INVENTION

Figure 1:
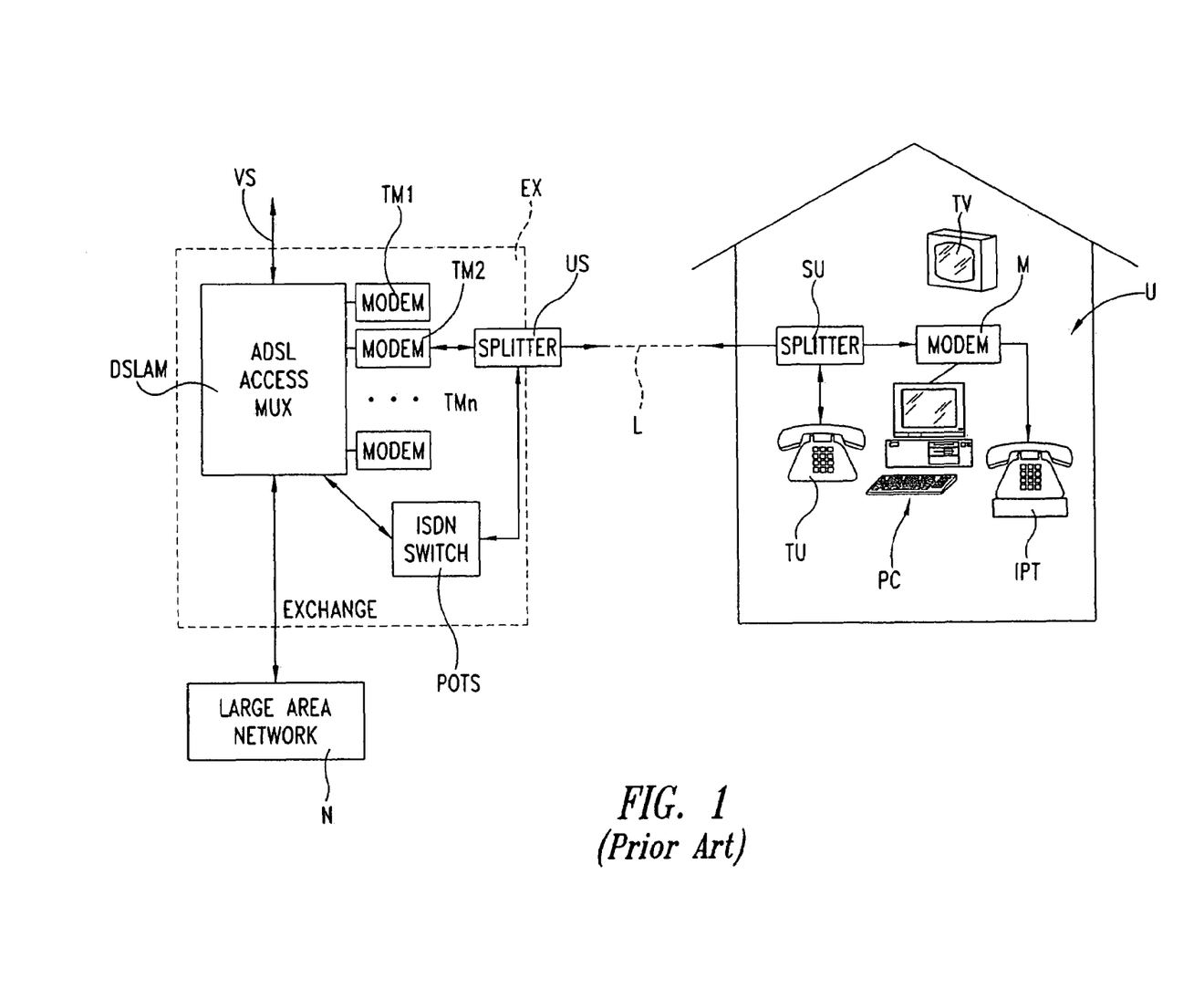
FIG. 1 illustrates the typical context of use of ADSL.

FIG. 1 shows a typical context of ADSL use.

At present ADSL (an acronym for Asymmetric Digital Subscriber Lines) is by far the most extensively used broadband Internet delivery method.

As schematically shown in FIG. 1, ADSL allows nominally 1.5 Mbps (in a range typically 500 kbps to 12 Mbps) to be delivered to customers on telephone lines downstream and roughly about ⅓ to ¹/₁₀ that rate to be delivered from the customer to the telephone operator upstream (where it is sent to the Internet service provider).

In the block diagram of FIG. 1 a large area network such as the Internet is designated N, while L designates as a whole a subscriber line enabling a user U (typically, a home user) to connect to the network N via a terminal such as a personal computer PC.

Equipment located with the user U includes a so-called "POTS (Plain Old Telecom Service) splitter" unit SU that preserves the possibility for the user to exploit the line(s) L for standard voice service via one or more telephone units TU. Connection of the terminal PC to the split unit SU is via an ADSL modem M. This is oftentimes configured in such a way to permit the user to connect to the network N to obtain additional services such as audio/video streaming services to be possibly displayed over an audio/video terminal TV. Additional features may offer the user a voice-over-IP service via a telephone terminal IPT equipped for IP voice communications.

The equipment at the telecommunication operator exchange EX includes another split unit US and a respective plurality of modems TM1, TM2, . . . TMN, each adapted to serve a respective user.

The modems TM1, . . . , TMN are connected to the network N via a so-called ADSL access Mux (DSLAM) that is usually connected also to a video switch VS. Interposed between the split unit US and the DSLAM is a further ISDN switch again currently designated POTS.

All the foregoing corresponds to basic principles and criteria of operation that are well known in the art. Additionally, in the following it will be generally assumed that the reader is familiar with the general structure and operation of an ADSL modem as used on the user side as disclosed e.g., in ITU G.992.1 (G.DMT): Asymmetrical digital subscriber line (ADSL) transceivers, July 1999), thus making it unnecessary to provide a more detailed description herein.

As indicated in the foregoing, a so-called bit swap arrangement is used during ShowTime (that is during the session involving transmission of the data payload) in order to improve the quality of modem performance.

The arrangement described herein operates at the receiver side, namely within the modem designated M in FIG. 1. There, the arrangement is in a position to monitor the signal-to-noise ratio and has all the information available as needed to make a bit swap decision, that is moving bits between different tones or change the tone gains in the modem. The main target of the bit swap arrangement is to minimize the bit error rate or, equivalently, to maximize the noise margin, especially in the case of VDSL modems. At present VDSL (an acronym for Very High Speed Digital Subscriber Lines) is a most promising modem arrangement able to support high data rates (up to 100 Mbps).

An interesting point in the bit swap arrangement described herein is the derivation of an array of the maximum gain increase "gmax_step" parameters (designated 100 in FIG. 2—one parameter is obtained for each tone used), that is the ratio (difference in dB) between the maximum gain (once all the constraints are fixed), that a certain tone e.g., in an ADSL modem can reach, and the current gain g(i) in the tone with index i.

In a VDSL modem this parameter definition consists mainly in the derivation of the limitation of the power spectral density (PSD) in sliding bandwidth windows. The sliding window parameter derivation can be performed even outside before the "Main Bit Swap" function because usually it does not require the knowledge of the SNR(i) but just the power constraint mathematical description.

The arrangement described herein is based on the assumption that the best place to derive this parameter is within the "Main Bit Swap" function for numerical stability reasons.

This function will be explained in detail the following.

The maximum gain depends on the power constraints, but also on the dynamic constraints of the current gain $g_i$ (for example ±2.5 dB). In addition, the resolution of the gain (g(i) in tone with index i) variation (for example step of 1 dB, this is a typical protocol limitation) is considered in this calculation.

All the corresponding computations are based on the SNR measure and more than one bit swap request can be derived using the same SNR request. This way of operating reduces the computational complexity because several parameters are based on the margin and are not required to be recalculated but simply updated and this only for tones that have changed.

The most important advantages of the proposed arrangement are:

low complexity: this makes it possible to manage a high number of tones (more then 2 k in VDSL);

the arrangement converges very close to the optimum solution;

priority: the main target is to increase as fast as possible the multi-tone margin. Then the arrangement tries to optimize also the situation for low-priority tones;

instability and block values for b(i)/g(i) (current bit/current gain in tone with index i) distributions are avoided. The related parameters are chosen with a very conservative criterion.

A main assumption is the linearity of the SNR(i) in respect of the current gain g(i) (it means that inter-symbol interference and inter-carrier interference should be not dominant).

As stated in the standard ANSI, "T1 E1.4 VDSL Draft Trial-Use Standard: Part 3", each bit swap request is composed of four message fields, each one with a single command. In each bit swap request, it is possible to insert a number smaller than four commands, inserting the command 'Do nothing'.

More than four commands are not generally allowed. Conversely, the possibility exists of:

increasing/decreasing by one the number of bits allocated (without changing the total number of bit allocated);

changing the transmitted power by the factor of, for example, −2, −1, +1, +2 and +3 dB.

In any case, the bit swap request performs power adjustment according to the following:

a gain adjustment with a maximum range −2.5 dB +2.5 dB on the transmitted PSD is allowed;

the PSD template defines the power limitation measured with the resolution bandwidth of 100 kHz in the in-band frequency range below 1.0 MHz and with the resolution bandwidth of 1 MHz in the in-band frequency range above 1.0 MHz (using a 100 KHz and 1 MHz sliding window, respectively). This is a constraint that is very difficult to manage as it links each tone to many other groups of tones (usually called windows because they are based on a fixed number of consecutive tones). This constraint is directly translated in an upper limitation of the power in different sliding window over all used tones. This limitation is used in the VDSL standard to avoid cross-talk increase in a specific bandwidth but is not inserted in the ADSL standard.

The sliding window power constraint has a high impact on the bit swap arrangement complexity and it is even worse in case of variable sliding window length. For that reason, a submultiple sliding window length (for example 100 kHz-sliding window instead of 1 MHz-sliding window) for all the frequencies is proposed. Such choice is standard compliant. This means that the power for each sliding window of NUMBER_OF_TONES_PSD_AVERAGE tones equal to a given number of tones is derived.

The complexity of a bit swap arrangement is proportional to the sliding window length, NUMBER_OF_TONES_PSD_AVERAGE. For example, the power increase of one tone can potentially influence (two times NUMBER_OF_TONES_PSD_AVERAGE−1) tones because the number of tones that belong to all possible sliding window containing a certain tone is (two times NUMBER_OF_TONES_PSD_AVERAGE−1).

The SNR measurement (FIG. 2, 130) array is then processed and it is derived the per-tone noise margin array. The per-tone noise margin array is the main input of a bit-swap arrangement. The minimum SNR to obtain a BER=$10^{-7}$ as a function of the constellation size is referred to as SNR(b(i)).

The main input of this function is the per tone margin set; for a certain tone i with b(i) bits, the equation below gives a check bit swap parameter:

$$m(b(i)) = \frac{g(i) \cdot SNR(i)}{SNR(b(i))}$$

Figure 2:
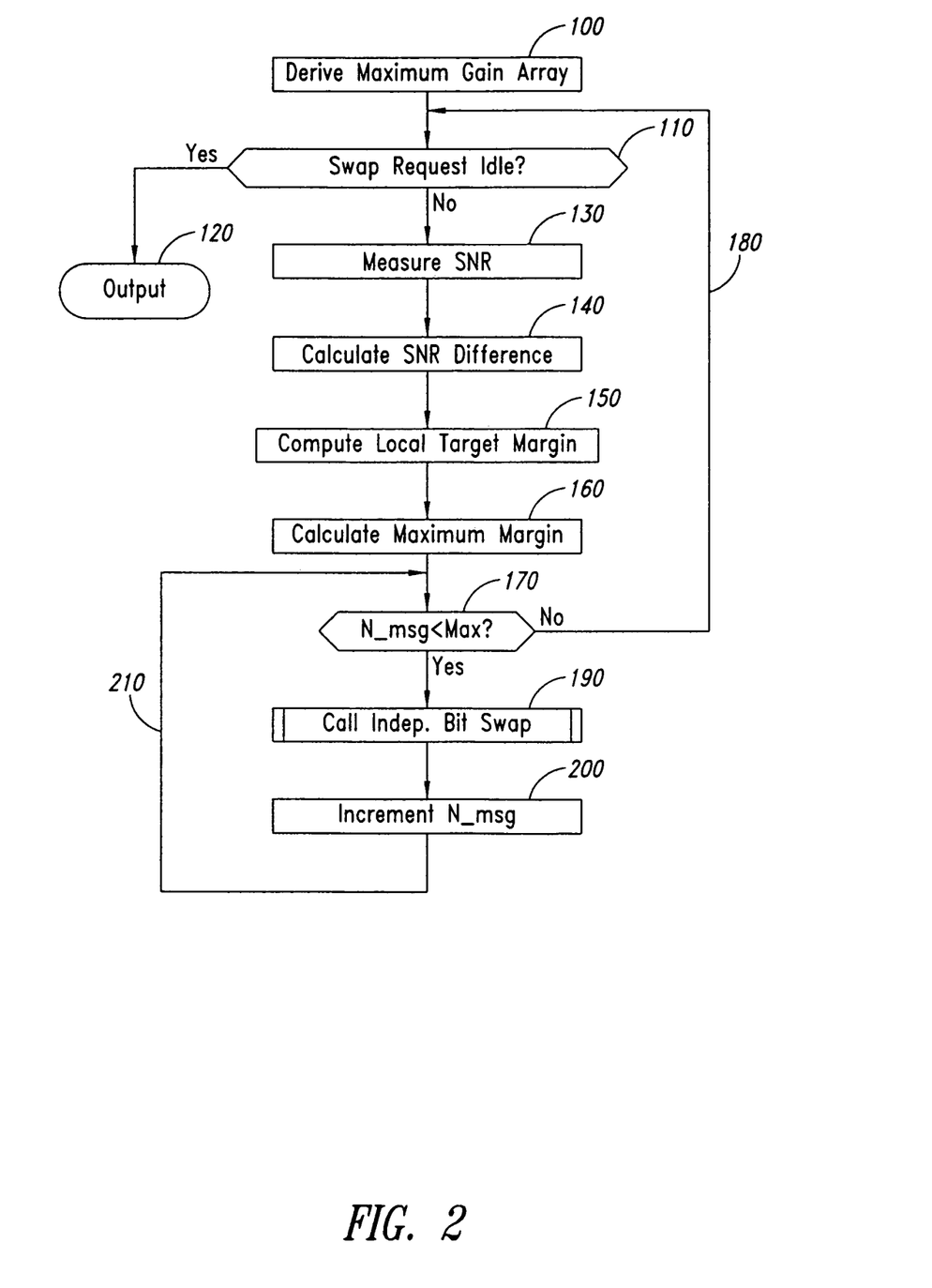
FIG. 2 is a flow-chart, exemplary of the bit swap arrangement described herein.

The main function that implements the bit swap arrangement is the "Main Bit Swap" function (its flow-chart is shown in FIG. 2). This function is in charge of deciding if a bit swap request is to be performed, by calling (FIG. 2, 190) the "Independent Bit Swap" function (in which a single set of commands is decided, flow-chart in FIGS. 3 an 4) and, if affirmative, how many bit swap requests have to be processed, on a single SNR measurement. The number of bit swap requests is updated (FIG. 2, 200) must be lower than a fixed constant ("MAX_NBR_MSG", FIG. 2, 170), and each new bit swap request is conditioned on having a previous bit swap request not idle (FIG. 2, 110). The derivation of more than one bit swap request per SNR measurement helps in reducing the average time needed to apply a bit swap command and to reduce the complexity of the algorithm. This may lead to an increased average time of reaction to noise variation.

In the "Main Bit Swap" function, a local target margin, i.e., a feasible margin to be reached with a certain number of bit swap requests, is computed (FIG. 2, 140) as follows: i. estimation of a local target margin. Two methods are proposed here;

ii. estimation of margin improvement with one additional bit on each tone, maximum obtainable margin on each tone; decision on enabling only power decrease; derivation of hysteresis parameters when plural bit swap requests have to be carried out on the same SNR measurement;

iii. cyclic call of the "Independent Bit Swap" function; each function call gives as an output a bit swap request (i.e., a coherent list of commands).

Additionally other important parameters are derived (FIG. 2, 160). Equations (10) provides an exact definition of such parameters. They are:

The per-tone margin (m(b(i)+1)) supporting the current number of bits plus one defined in equation 10.a.

The maximum margin we can reach on the current number of bits (m_max(b(i))) defined in equation 10.b.

The maximum margin we can reach on the current number of bits plus one (m_max(b(i)+1)) defined in equation 10.c.

(10.a)
$$m(b(i)+1) = m(b(i)) \frac{SNR(b(i))}{SNR(b(i)+1)}$$

(10.b)
$$m\_max(b(i)) = m(b(i)) \cdot gmax\_step(i)$$

(10.c)
$$m\_max(b(i)+1) = m(b(i)+1 \cdot gmax\_step(i)$$

(10)

The output of the "Main Bit Swap" function is a list of VOC (VDSL overhead channel) bit swap requests (FIG. 2, 120). If no bit swap request has to be issued, the bit swap request should be avoided. Otherwise, the protocol starts as described in ANSI, "T1E1.4 VDSL Draft Trial-Use Standard: Part 3".

The heart of the Bit Swap arrangement described herein is the "Independent Bit Swap" function (described in FIGS. 3 and 4, header in 300) that is in charge of two operations: it decides which bit swap commands have to be made and it segments the VOC message. The VOC message segmentation can be done in a sub-routine without any loss of generality. The main output of this function is a list of coherent bit swap commands of a VOC message.

The main complexity (or a big part of it) of the arrangement is assumed to be due to the Constraint Parameters Derivation function (mainly Sliding Window parameter derivation in VDSL) that computes power constraint limitations. For that reason, the choice has been made of splitting this derivation in two functions: Power Constraints Derivation and Power Constraints Update.

The first function is run after the values for the current gain g(i) are definitively derived, i.e., after the BiGi Compression algorithm during the Channel Analysis & Exchange state or "Main Bit Swap" function (FIG. 2, 100) if numerical stability problems are foreseen. This function derives the power constraint limitations on all the transmission bandwidth in a very efficient way (the high number of tones and the possibility of different bands is to be taken into account).

The second function is called by the "Independent Bit Swap" function if a variation of gain is done. In that case, a variation of the power constraint should indeed be derived locally: a variation of one gain has impact on no more than (twice NUMBER_OF_TONES_PSD_AVERAGE−1) tones. Using a specific function, this operation can be carried out in a very efficient way.

Figure 3:
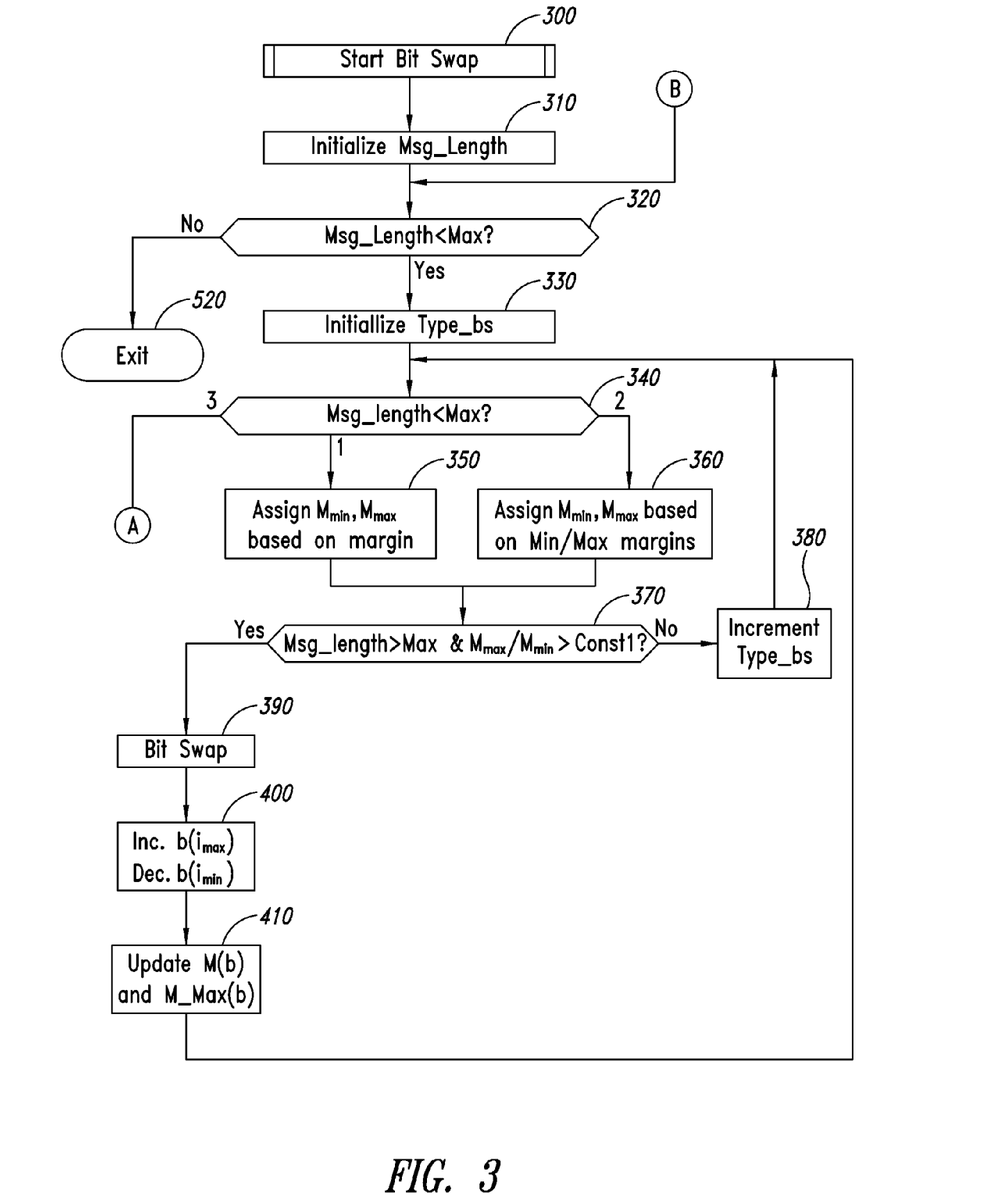
FIG. 3 shows a first portion of a sub-routine included in the arrangement described herein.
Figure 4:
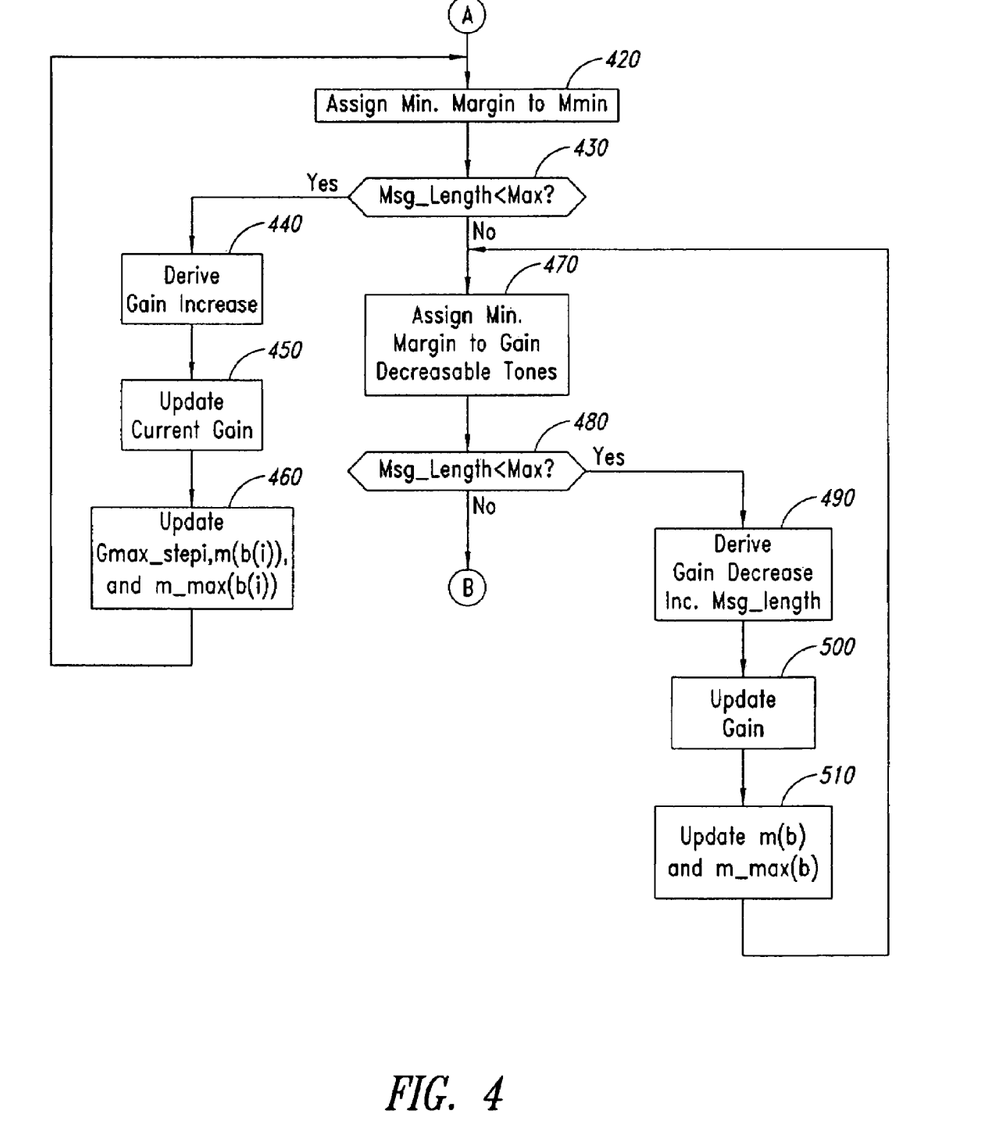
FIG. 4 shows a second portion of the sub-routine of FIG. 3.

The second function will be explained in detail below in the VDSL sliding window constraint (FIG. 3, 410).

The Independent Bit Swap function is the more important function related to bit swap: it makes the bit swap decision and segments the VOC messages.

It is composed of three main steps:
 i. in the first step a bit swap (BS) decision is made.
 A priority order is considered here:
  a. urgent BS, where the functional decision is the margin (FIG. 3, 350).
  b. not urgent BS, where the functional decision is the maximum margin (see the Equations designated 10.a and 10.b above—FIG. 3, 360);
 ii. in the second step, a power increase (PI) decision is made (FIG. 4, 440, 450, 460);
 iii. in the third step, a power decrease (PD) decision is made (FIG. 4, 490, 500, 510).

A priority order is considered here:
 a. active tones (no pilot, and b(i)>0) with g(i)≧1;
 b. active tones (no pilot, and b(i)>0) with a gain that can be decreased;
 c. idle tone (no pilot, b(i)=0) with a gain that can be decreased.

The previous list gives also a decreasing priority order of different commands (i.e., BS has a higher priority than PD). An iteration that includes steps i, ii and iii is inserted. This means that all steps are evaluated and, at the end, if at least one command is available and at least one command was used, a new iteration is performed.

This approach helps in increasing the efficiency of the arrangement (i.e., to use, if possible, all the available commands)

Three types of tones will be considered:
Active Tone;
Pilot Tone;
Idle Tone (i.e., with $b_i=0$).

The first step can run only if a minimum number of commands are available. For an urgent BS (i.a), at least two commands are required while for a non-urgent BS (i.b) two commands plus half of the used commands (to be used for a potential PI) are required. This is because the BS command pair does not guarantee by itself a margin improvement, while a BS command pair in conjunction with one PI guarantees it.

The decision on the tones on which the urgent bit swap should be performed is based on the margin parameter $m_i(b_i)$. If one tone has a margin with one additional bit higher than a current tone margin the bit swap is done.

The candidate tone to lose one bit is the active or pilot tone with minimum m(b(i)) while the candidate tone to obtain one additional bit is the active or idle tone with higher m(b(j)+1).

The decision on the tone on which the non-urgent bit swap (i.b) should be performed is based on the parameter m_max (b(i)). This is defined as the maximum margin that can be reached with one PI operation. The decision of a PI action is independently taken in step ii. See Equation 10 for the exact definition.

The candidate tone to lose one bit is the active or pilot tone with minimum m_max(b(i)) while the candidate tone to obtain one additional bit is the active or idle tone with higher m_max(b(j)+1).

In both methods, the BS operation between tones i and j is done if the ratio between the reference margin m(b(i)) and the maximum margin mm_max(b(i)) respectively for urgent bit swap and not urgent bit swap is higher than SWAP_DELTA_MARGIN. SWAP_DELTA_MARGIN parameter is used to guarantee reliable operation.

The SWAP_DELTA_MARGIN is the minimum parameter between max(m(b(i)))/min(m(b(j)+1)) and max(m(b(i)))/ min(m_max(b(j)+1)) for urgent BS and not urgent BS to perform a bit swap operation, respectively.

Having SWAP_DELTA_MARGIN>1 ensure a stable operation.

Once the decision is made to perform the BS operation, the following actions are taken:
 increase/decrease the swapped bits;
 update the margin m(b(i)) and m(b(i)+1), maximum margin m_max(b(i)) and m_max(b(i)+1) for both tones with index i and j;
 build bit swap request message.

The second step is related to the power increase operation. Given the "increasable" gain array, gmax_step(i), and the margin array m(b(i)), the candidate tone for PI is chosen as the active tone with an "increasable" gain (i.e., with gmax_step (i)>1) and with a minimum margin m(b(i)).

The PI operation is performed if:
 the minimum margin is lower then the local target margin, $\Gamma_{MC}$;
 at least one command can be used in this operation.

In this case, the main operations to be carried out are:
 derivation of the new g(i) (gnew);
 update the margin m(b(i)) and m(b(i)+1), maximum margin m_max(b(i)) and m_max(b(i)+1) only for tone i;
 update the power constraint(s);
 build the bit swap request message.

The third step is related to the PD command. Given the increasable gain array, gmax_step(i), and the margin array m(b(i)), and a mask identifying to which of the three sets the tones belong, the tone with the maximum margin is found for every set. Three consecutive iterations are performed, each based on a different set of tones. The candidate tone chosen for PD is the one with the maximum margin among these three sets of tones. Different priorities are considered as already explained in iii.a, iii.b and iii.c. The main difference between the different priorities is the set in which the tone candidate to the power reduction is found.

In all cases considered, the PD operation is performed if:
 the margin on the tone is higher than the local target margin $\Gamma_{MC}$ increased by GI_INC_STEP and the safety parameter MAXIMUM_ADDITIONAL_MARGIN (added to avoid instability); and
 at least one command is available for this operation.

If the PI operation is carried out, the main operations performed are:
 derivation of the new g(i);
 update the margin m(b(i)) and m(b(i)+1), maximum margin m_max(b(i)) and m_max(b(i)+1) for tone i;
 update power constraints;
 build bit swap request message.

A practical embodiment of the arrangement described in the foregoing will now be described in connection with the flowcharts of FIGS. 2 to 4.

In FIG. 2, reference numeral 100 indicates an input step which performs a per tone derivation of the maximum increase of gain based on all power, PSD, sliding window, protocol constraints (this operation is usually called constraint parameter update). After that, in a decision step 110 a decision is made as to whether a bit swap strategy is to be continued or stopped. If the decision is to stop the bit swap algorithm, the next step is a step 120 that causes the exit from the bit swap algorithm and provide a list of bit swap requests.

Conversely, if the decision is to continue the bit swap algorithm, the successive step is a step 130. This step 130 performs a per tone SNR measurement. In successive step 140 the difference between the measured SNR and the SNR_required(b) is calculated and the result is assigned to a margin parameter m(b(i)). This operation is executed for values of b between (b(i)−1) and (b(i)+1). A next step 150 performs the operation for calculating the local target margin that is a reachable multi-tone margin. After that a step 160 calculates the maximum margin m_max(i)=(m(b(i))+Gmax_step) for value of b included between (b(i)) and (b(i)+1), and N_msg variable is forced to zero.

The successive step 170 is another decision step. If the condition N_msg<MAXN_MSG is verified, the next step is a step 190, otherwise the line 180 indicates that the algorithm returns to the decision step 110. The step 190 is a function-call step and recalls the INDBITSWAP sub-routine described in FIG. 3 and FIG. 4. The last step 200 performs the unit increment of the parameter N_msg. The line 210 indicates that after the step 200 the algorithm returns to the decision step 170.

Specifically, in FIG. 3 the step 300 indicates the start step of the INDBITSWAP sub-routine and this step is referred to as 190 in FIG. 1.

The step 310 in FIG. 3 is an initialization step. In this step 310 the value one is assigned to Do_something parameter, and the value zero is assigned to Msg_length parameter. The first one is a Boolean parameter while the second is an integer. After that, in a decision step 320 the Boolean condition ((Msg_length<MAX_MSG_LENGTH) & (Do_something)) is evaluated. If the condition is false, the successive step is a step 520, which causes the exit from the algorithm delivering the list of commands. Otherwise if the condition is true, the next step is another initialization step 330 that assigns zero to Do_something Boolean parameter and one to Type_bs parameter. Therefore the next step is a selection step 340 that chooses a different way of operating on the basis of the value of Type_bs parameter. If Type_bs parameter is equal to one, the process continues with the step 350. In this step 350 the minimum margin value (m(b(i))) is assigned to the parameter ($M_{min}$ $i_{min}$), and the maximum margin value (m(b(i)+1)) is assigned to the parameter ($M_{max}i_{max}$), where M represents the max/min value and i is the related index. If the Type_bs parameter is equal to two the algorithm continues with a step 360. In this step 360 the minimum margin value (m_min(b(i))) is assigned to the parameter ($M_{min}i_{min}$), and the maximum margin value (m_max(b(i)+1)) is assigned to the parameter ($M_{max}i_{max}$). The next step for each of the previous ways is the decision step 370 where the Boolean condition ((Msg_length<MAX_MSG_LENGTH−1) & ($M_{max}$/$M_{min}$>const1)) is evaluated. The const1 is a BS hysteresis parameter.

If the condition is false the following step is a step 380 where the value of Type_bs is incremented by one unit, and the algorithm returns to selection step 340. Otherwise, if the condition in step 370 is true, the successive step is a step 390 where a bit swap tone between tone with index $i_{min}$ and $i_{max}$ takes place, and then the value of Msg_length is incremented by two units, and finally Do_something is set equal to one. After that, in a step 400 the value of b($i_{min}$) is decremented by one unit and the value of b($i_{max}$) is incremented by one unit. In a subsequent step 410 Gmax_step array, m(b) and m_max(b) are updated for all the tones involved for values of b between [b(i) (b(i)+1)]. After step 410, the algorithm return to the selection step 340. If the value of Type_bs is equal to three after step 340 step 420 in FIG. 4 is executed.

In the step 420 the minimum margin value (m(b(i))) is assigned to the parameter ($M_{min}$ $i_{min}$) of all gain increasable tones. The subsequent step 430 is a decision step where the Boolean condition ((Msg_length<MAX_MSG_LENGTH−1) & ($M_{min}$<Target_margin_local*const2)) is evaluated. The const2 is a PI (power increase) hysteresis parameter. If the condition 430 is verified the algorithm continues with a step 440 where a gain increase is derived for tone $i_{min}$ and parameter Msg_length is incremented by one unit, and finally Do_something is set equal to one.

A subsequent step 450 produces an update operation in the current gain g($i_{min}$). In a subsequent step 460 the update operations of Gmax_stepi, m(b(i)) and m_max(b(i)) for all the tones involved are performed for values of b between [b(i) (b(i)+1)]. After step 460, the algorithm returns to the step 420.

On the other side, if the condition 430 is false, the process continues with a step 470 where the minimum margin value (m(b(i))) is assigned to the parameter ($M_{min}$ $m_{min}$) for all the gain decreasable tones. The successive step 480 is a decision step where the Boolean condition ((Msg_length<MAX_MSG_LENGTH−1) & ($M_{min}$<Target_margin_local*const3)) is evaluated. The const3 is a PD (power decrease) hysteresis parameter. If the condition 480 is verified, the process continues with a step 490. In the step 490 a gain decrease is derived for tone $i_{max}$ and the parameter Msg_length is incremented by one unit, and finally Do_something is set equal to one.

The subsequent step 500 involves an update operation of the current gain g($i_{max}$). In the successive step 510 the update operations of Gmax_step array, m(b) and m_max(b) are performed for all the tones involved for values of b between [b(i) (b(i)+1)]. After that, the algorithm returns to the step 470.

Of course, without prejudice to the underlying principle of the invention, the details and embodiments may vary, also significantly, with respect to what has been described and shown, just by way of example, without departing from the scope of the invention as defined by the claims that follow.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method to control performance of a modem wherein each tone of a plurality of tones has an associated tone gain value and a maximum reachable tone gain value, and each tone of the plurality of tones is used in the modem to carry a bitstream, the method comprising:
configuring the modem to:
perform at least one of:
selectively swapping bits between at least two tones in said plurality of tones, and
selectively changing at least one tone gain value to optimize an error parameter;
determine current tone gain values for said plurality of tones;
determine gain margins between said maximum reachable tone gain values and said current tone gain values, respectively; and
perform, to optimize said error parameter as a function of said gain margins, at least one of:
varying a number of bits allocated to said plurality of tones, the varying including taking away one bit from a first tone of the plurality of tones in which the first tone has a minimum gain margin value of said gain margins, and adding one bit to a second tone of the plurality of tones in which the second tone has a higher gain margin of the gain margins, and performing a transmitted power variation by varying at least one of the current tone gain values.

2. The method of claim 1, including changing the number of bits allocated to each of said tones without changing a total number of bits allocated to the plurality of tones.

3. The method of claim 1 wherein said transmitted power variation includes either increasing or decreasing said at least one of the current tone gain values.

4. The method of claim 1, wherein varying said at least one of the current tone gain values includes varying said at least one gain value by discrete steps.

5. The method of claim 1, wherein determining said gain margins includes determining said gain margins as a difference in dB between each said maximum reachable tone gain value and said each respective current tone gain value.

6. The method of claim 1, further comprising selecting said error parameter as a bit error rate whereby said optimizing involves minimizing said bit error rate as a function of said gain margins.

7. The method of claim 1, further comprising selecting said error parameter as a noise margin, whereby said optimizing involves maximizing said noise margin as a function of said gain margins.

8. The method of claim 1, wherein said varying at least one of the tone gain values involves a power decrease and said power decrease is effected on said at least one of the tone gain values based on a priority order including:

active tones having a respective current tone gain value larger or equal to one;

active tones having a respective current tone gain value that can be decreased; and idle tones having a respective current tone gain value that can be decreased.

9. The method of claim 1, further comprising giving priority to said operation of varying the number of bits allocated to said tones over said transmitted power variation, at least in so far as said transmit power variation involves a power decrease.

10. The method of claim 1, further comprising identifying, among said plurality of tones, at least one tone on which said bit swapping is to be performed urgently based on an urgency margin parameter indicative of respective tones having a gain margin with one additional bit higher than a current value for said gain margin.

11. The method of claim 1, further comprising selecting among said plurality of tones, at least one tone for which said bit swapping is to be performed on a non-urgent basis as a function of a non-urgency maximum margin indicative of a maximum gain margin that can be reached in said at least one tone by a transmitter power increase.

12. The method of claim 11, further comprising comparing said non-urgency maximum margin with a threshold value.

13. A system to control performance of a modem wherein a plurality of tones, each having a respective tone gain value and a respective maximum reachable tone gain value, are used for carrying respective bitstreams, the system comprising:

at least one of:
means for selectively swapping bits between at least two tones in said plurality of tones and
means for selectively changing at least one tone gain value to optimize an error parameter;
means for determining current tone gain values for said plurality of tones;
means for determining gain margins between said maximum reachable tone gain values and said current tone gain values; and
means for performing, to optimize said error parameter as a function of said gain margins, at least one of:
varying a number of bits allocated to said plurality of tones, the varying including taking away one bit from a first tone of the plurality of tones in which the first tone has a minimum gain margin value of said gain margins, and adding one bit to a second tone of the plurality of tones in which the second tone has a higher gain margin of the gain margins, and
performing a transmitted power variation by varying said tone gain values.

14. The system of claim 13, wherein said plurality of tones comprise a discrete multi-tone-technology arrangement.

15. The system of claim 13, wherein said plurality of tones comprise an Orthogonal Frequency Division Multiplexing arrangement.

16. The system of claim 13, wherein said modem is a DSL modem.

17. The system of claim 16, wherein said modem is a VDSL modem.

18. The system of claim 16, wherein said modem is an ADSL modem.

19. The system of claim 13, wherein said modem has an associated feedback channel.

20. A computer-readable medium whose contents cause a computing device to control performance of a modem arrangement wherein a plurality of tones having associated gains with respective maximum reachable values are used for carrying respective bitstreams, by performing a method comprising:

at least one of selectively swapping bits between said tones in said plurality and selectively changing said tone gains to optimize an error parameter;

determining current values for said associated gains;

determining gain margins between said maximum reachable values and said current values; and performing, to optimize said error parameter as a function of said gain margins, at least one of:
varying a number of bits allocated to said tones, the varying including taking away one bit from a first tone of the plurality of tones in which the first tone has a minimum gain margin value of said gain margins, and adding one bit to a second tone of the plurality of tones in which the second tone has a higher gain margin of the gain margins, and
performing a transmitted power variation by varying said gains.

21. The computer-readable medium of claim 20, wherein the method includes changing the number of bits allocated to each of said tones without changing a total number of bits allocated to the plurality of tones.

22. The computer-readable medium of claim 20, wherein determining said gain margins includes determining said gain margins as a difference in dB between said maximum reachable gain values and said current values.

23. The computer-readable medium of claim 20 wherein the method further includes selecting said error parameter as a bit error rate and optimizing involves minimizing said bit error rate as a function of said gain margins.

24. The computer-readable medium of claim 20 wherein the method further includes selecting said error parameter as a noise margin and optimizing involves maximizing said noise margin as a function of said gain margins.

25. The computer-readable medium of claim 20 wherein the method further includes giving priority to said operation of varying the number of bits allocated to said tones over said transmitted power variation, at least in so far as said transmit power variation involves a power decrease.

26. The computer-readable medium of claim 20 wherein the method further includes identifying, among said plurality of tones, tones on which said bit swapping is to be performed urgently based on an urgency margin parameter indicative of respective tones having a gain margin with one additional bit higher than a current value for said gain margin.

27. The computer-readable medium of claim 20 wherein the method further includes selecting among said plurality of tones, tones for which said bit swapping is to be performed on a non-urgent basis as a function of a non-urgency maximum margin indicative of the maximum margin that can be reached in said tones by a transmitter power increase.

28. A method, comprising:
controlling performance of a modem configured to employ a plurality of tones having tone gain values, respectively, and maximum reachable tone gain values, respectively, each tone of the plurality of tones being used in the modem to carry a bitstream, the controlling including configuring the modem to:
perform at least one of:
selectively swapping bits between at least two tones in said plurality of tones, and
selectively changing at least one tone gain value to optimize an error parameter wherein the error parameter is a noise margin;
determine current tone gain values for said plurality of tones;
determine gain margins between said maximum reachable tone gain values and said current tone gain values, respectively, and wherein optimizing the error parameter includes maximizing the noise margin as a function of the gain margins; and
perform, to optimize said error parameter as a function of said gain margins, at least one of:
varying a number of bits allocated to said plurality of tones, and
performing a transmitted power variation by varying at least one of the current tone gain values.

29. The method of claim 28, including changing the number of bits allocated to each of said tones without changing a total number of bits allocated to the plurality of tones.

30. The method of claim 28 wherein said transmitted power variation includes either increasing or decreasing said at least one of the current tone gain values.

31. The method of claim 28 wherein determining said gain margins includes determining said gain margins as a difference in dB between each said maximum reachable tone gain value and said each respective current tone gain value.

* * * * *

UNITED STATES PATENT AND TRADEMARK OFFICE
CERTIFICATE OF CORRECTION

PATENT NO. : 7,664,169 B2  Page 1 of 1
APPLICATION NO. : 11/496970
DATED : February 16, 2010
INVENTOR(S) : Marco Bonaventura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 778 days.

Signed and Sealed this

Thirtieth Day of November, 2010

David J. Kappos
*Director of the United States Patent and Trademark Office*